United States Patent Office 2,816,908
Patented Dec. 17, 1957

2,816,908
PREPARATION OF ORTHO-PHTHALONITRILE

Robert S. Aries, New York, N. Y.

No Drawing. Application June 29, 1956,
Serial No. 594,711

5 Claims. (Cl. 260—465)

The present invention relates to a novel process for the preparation of ortho-phthalonitrile. More particularly, it relates to a novel process for the direct conversion of naphthalene to ortho-phthalonitrile.

Heretofore, ortho-phthalonitrile has been prepared by the reaction of phthalic acid or anhydride with ammonia, the phthalic acid having first been prepared by oxidation of naphthalene or ortho-xylene. Not only does this call for a two-stage process, but where xylene is used, it is necessary to employ the pure ortho-isomer if an end product is desired which is free from the meta- and para-isomers. Consequently, it is also necessary when proceeding in this manner either to effect a fractionation of the starting material or of the end product to remove isomers of substantially identical physical properties.

It has now been found that ortho-phthalonitrile can be prepared free from isomers in a single step from a readily available starting material without extensive preliminary fractionation.

In accordance with the present invention, naphthalene is reacted with air or other oxygen-containing gas and with ammonia in the presence of catalysts and at elevated temperatures. Ortho-phthalonitrile is obtained directly in high yield. The reaction involves rupture of one of the rings of the naphthalene and removal of two carbon atoms, as well as a partial oxidation of the two remaining carbon atoms attached to the benzene ring. The exact route of the reaction is not certain but any catalyst can be employed which is suitable for the oxidation of naphthalene to phthalic anhydride. While vanadium and its oxides are preferred, other metals such as molybdenum, chromium, cobalt, iron manganese, copper, tin, tungsten, thorium, aluminum, uranium, and the like, as well as their oxides, and mixtures thereof, can be employed.

Two moles of ammonia are required per mole of naphthalene converted but preferably at least four moles are present. There is no advantage in increasing the ammonia ratio beyond twenty moles, other than that it helps dissipate the heat of the reaction. Four and a half moles of oxygen per mole of naphthalene is the theoretical minimum but preferably at least twice that amount is employed. Since air is approximately 20 mole percent oxygen, five times as much air is employed, i. e., preferably at least 45 moles per mole of naphthalene. Up to 200 moles of air can be present, if desired, without materially altering the results.

The reaction is effected in the vapor phase by passing a gaseous mixture of the reactants over the heated catalyst, the temperature ranging between about 300° C. and 600° C. Preferably, the temperature ranges between about 350° C. and 525° C. The reactant gases are conveniently preheated by heat exchange with the exit gases which are subsequently cooled still further for condensation of the ortho-phthalonitrile either separately from or together with the water vapor.

The following example illustrates the novel process:

Example

Into a vaporizer maintained at a temperature of 100° C. there are fed 5 grams of naphthalene per hour together with 50 liters of air and 20 liters of ammonia per hour. The gaseous mixture is preheated to 300° C. and passed through a reaction zone filled with 40 cc. of vanadium pentoxide on ⅛ inch alumina pellets. The catalyst temperature is 425° C. The resulting gases leaving the reaction zone are trapped at Dry-Ice temperature and the condensate analyzed for ortho-phthalonitrile. There is obtained a yield of 88% based on the naphthalene feed.

Various changes and modifications may be made without departing from the spirit and scope of the present invention and it is intended that such obvious changes and modifications be embraced by the annexed claims.

What I claim is:

1. The process for the preparation of ortho-phthalonitrile which comprises passing over a catalyst for the oxidation of naphthalene to phthalic anhydride at a temperature ranging between about 300° C. and 600° C. a gaseous mixture of naphthalene, at least twice the molar amount of ammonia as of naphthalene and at least four and a half times the molar amount of oxygen as of naphthalene.

2. The process for the preparation of ortho-phthalonitrile which comprises passing over a catalyst for the oxidation of naphthalene to phthalic anhydride at a temperature ranging between about 350° C. and 525° C. a gaseous mixture of naphthalene, at least four times the molar amount of ammonia as of naphthalene and at least nine times the molar amount of oxygen as of naphthalene.

3. The process for the preparation of ortho-phthalonitrile which comprises passing over a catalyst for the oxidation of naphthalene to phthalic anhydride at a temperature ranging between about 350° C. and 525° C. a gaseous mixture of naphthalene, about four to twenty moles of ammonia per mole of naphthalene and about 9 to 40 moles of oxygen per mole of naphthalene.

4. The process defined in claim 3, wherein said catalyst comprises an oxide of vanadium.

5. The process defined in claim 3, wherein the oxygen is introduced as air.

References Cited in the file of this patent

UNITED STATES PATENTS

| | | |
|---|---|---|
| 2,203,861 | Deem et al. | June 11, 1940 |
| 2,499,055 | Cosby et al. | Feb. 28, 1950 |